United States Patent

Vogel et al.

Patent Number: 5,848,616
Date of Patent: Dec. 15, 1998

[54] CLOSING DEVICE FOR CLOSING PRESSURE FLUID CONVEYING CHANNELS IN A HOUSING

[75] Inventors: Gunther Vogel, Dreieich; Peter Volz, Darmstadt, both of Germany

[73] Assignee: ITT Automotive Europe GmbH, Germany

[21] Appl. No.: 737,052

[22] PCT Filed: Apr. 22, 1995

[86] PCT No.: PCT/EP95/01532

§ 371 Date: Nov. 4, 1996

§ 102(e) Date: Nov. 4, 1996

[87] PCT Pub. No.: WO95/30108

PCT Pub. Date: Nov. 9, 1995

[30] Foreign Application Priority Data

May 2, 1994 [DE] Germany .......................... 44 15 341.4

[51] Int. Cl.⁶ .................................................. F16L 55/11
[52] U.S. Cl. .......................... 138/89; 138/96 R; 29/522.1
[58] Field of Search .................... 138/89, 89.3, 96 R; 29/402.09, 520, 521, 522.1, 523

[56] References Cited

U.S. PATENT DOCUMENTS

| | | | |
|---|---|---|---|
| 208,292 | 9/1878 | Carroll | 138/89 |
| 1,620,728 | 3/1927 | Jackson . | |
| 1,686,562 | 10/1928 | Jackson | 138/89 |
| 1,929,824 | 10/1933 | Polley . | |
| 1,946,065 | 2/1934 | Dodge | 29/520 |
| 2,010,569 | 8/1935 | Sitzler | 138/89 |
| 2,138,404 | 11/1938 | Haas . | |
| 3,270,793 | 9/1966 | Polmon | 29/522.1 |
| 3,325,891 | 6/1967 | Hook et al. | 138/89 |
| 3,387,735 | 6/1968 | DeMarco . | |
| 3,451,583 | 6/1969 | Lee, II | 29/522.1 |
| 3,555,656 | 1/1971 | Brown et al. | 138/89 |
| 3,560,030 | 2/1971 | Macks et al. | 29/522.1 |
| 3,571,903 | 3/1971 | Persson | 29/520 |
| 3,578,027 | 5/1971 | Zopfi | 138/89 |
| 3,825,146 | 7/1974 | Hirmann | 138/89 |
| 4,046,168 | 9/1977 | Milne | 138/96 R |
| 4,170,247 | 10/1979 | Bates | 138/89 |
| 4,682,707 | 7/1987 | Wiles | 138/89 |
| 4,726,401 | 2/1988 | Nagano et al. . | |
| 5,194,214 | 3/1993 | Snyder et al. | 138/89 |
| 5,311,910 | 5/1994 | Hasegawa et al. | 138/96 R |

FOREIGN PATENT DOCUMENTS

| | | |
|---|---|---|
| 0411215 | 6/1991 | European Pat. Off. . |
| 538132 | 10/1931 | Germany . |
| 1914618 | 1/1970 | Germany . |
| 2133933 | 2/1972 | Germany . |
| 87160609 U | 5/1989 | Germany . |
| 4142153 | 6/1993 | Germany . |
| WO9110071 | 11/1991 | WIPO . |

OTHER PUBLICATIONS

English translation of the International Preliminary Examination Report for Application No. PCT/EP95/01532, Nov. 1996.

*Primary Examiner*—Denise L. Ferensic
*Assistant Examiner*—James F. Hook
*Attorney, Agent, or Firm*—J. Gordon Lewis; Thomas N. Twomey

[57] ABSTRACT

A closing device for closing pressure fluid conveying channels in a housing by a closing member press fitted into a channel. The outside periphery of the closing member including at least one indentation into which, during press fitting the closing member into the channel, basic material of the housing is deformed to provide a form lock, and the channel is configured as a stepped bore having an outside bore portion of large diameter that is remote from the pressure fluid side which, through a step, is followed by an inside bore portion of smaller diameter that is close to the pressure fluid side. The closing member has two piston portions of differently large diameters which correspond to the two bore portions, and the indentation provided between the piston portions is undercut relative to the small diameter portion, and the basic material is press fitted by plastic deformation into the indentation to provide the form lock.

4 Claims, 1 Drawing Sheet

CLOSING DEVICE FOR CLOSING PRESSURE FLUID CONVEYING CHANNELS IN A HOUSING

TECHNICAL FIELD

The present invention relates to a closing device for sealing pressure fluid conveying channels in a housing.

BACKGROUND OF THE INVENTION

German utility model No. 87 16 060 discloses a closing device for closing bores or channels in which pressure fluid is conveyed. The closing device has a positive connection with the housing by a closing member pressed into a stepped bore. The basic material of the stepped bore, which provides the form lock, is plastically deformed into an indentation between two piston portions on the closing member which correspond to the two bore portions. The closing member is thereby fastened and sealed in the housing bore.

Because the retaining and sealing effect of the closing member in the housing is defined by the operating pressure applied to the inside surface of the closing member, the attachment of the closing member described hereinabove is not appropriate in all cases of application. In particular, in closure caps or cap-shaped closing members which have a relatively large end surface exposed to the operating pressure and are subjected to high forces, and often in such applications detachment of the closing member from its fastened position, caused by self-clinching, cannot be prevented. Often, the result of such attachment techniques is leaking, and in extreme cases total failure of the closing member may occur.

U.S. patent application Ser. No. 3,387,735 discloses a closing member for closing an opening in a housing. When entering the housing opening, the closing member, due to differently large piston cross-sections, plastically deforms the housing material into an annular groove provided between the two piston cross-sections. Further, a chamber is arranged on the outside surface of the closing member which is covered by the clinched material of the housing opening. Thus, the closing member is attached in the housing opening by a combination of self-clinched engagement and an outside clinched engagement.

However, the subject matter claimed in the present invention differs greatly from this citation because it does not provide an outside clinched engagement of the housing material on the closure member. Instead, the outside bore portion of the housing has a recess including a supporting surface into which a supporting surface of the closing member engages by way of expansion.

European patent application No. 0 411 215 discloses a thin-walled closing member which is attached on an annular shoulder within a housing opening. The annular shoulder is bounded by a recess in the housing opening. When a clinching tool is inserted into the housing opening, the web-shaped fringe area of the thin-walled closing member deforms plastically into the recess, without the action of a radial force.

Therefore, an object of the present invention is to provide a closing device for closing pressure fluid conveying channels in a housing which involves a particularly reliable attachment and sealing of the closing member in the housing, and to indicate a suitable fastening method therefor.

According to the present invention, this object is achieved wherein the external bore portion remote from the pressure fluid includes at least one supporting surface on which a supporting surface of the closing member that is directed to the outside of the housing is movable into abutment. The closing member initially performs an advancing movement into the channel caused by a press-in force of a defined direction and magnitue which acts on the closing member, in order to deform the housing material into the recess by a force applied to the closing member, thereby providing the plastic form lock at the indentation of the closing member. Further, in another step of the method, a supporting surface on the closing member directed to the outside surface of the housing is urged into a recess on the outside bore portion.

Preferably, the supporting surface arranged on the outside bore portion is part of a recess in the housing which, depending on the case of application, can be manufactured relatively easily by means of chipless forming or chip-cutting machining.

To provide a reliable, yet simple seal between the supporting surface on the outside bore portion and the supporting surface of the closing member, the supporting surface on the outside bore portion is provided by a collar fitted to the closing member. With respect to the transmission of forces from the closing member to the supporting surface on the housing, the collar has a correspondingly high moment of resistance and is easy to manufacture under manufacturing technology aspects.

Preferably, the collar is expanded in the direction of the recess in order to cause a more or less direct introduction of a retaining force of the closing member into the recess as a function of the extent of expansion of the collar.

To attach the closing member in the housing, a preferred method includes sliding the closing member into the channel by a press-in force of a defined direction and magnitude. The housing material which provides the plastic form lock at the indentation of the closing member is deformed into the indentation by the action of a force applied to the closing member, and a supporting surface on the closing member directed to the outside of the housing extends into a recess in the outside bore portion. A redundant attachment is thereby provided which is a combination of a self-clinched engagement and a subsequent expanding action. The expanding action may be automatic depending on the material chosen and the way the supporting surfaces on the closing member are configured.

Preferably the collar shaped on the closing member is plastically expanded in the direction of the recess in the housing by a tool placed on the inner edge of the collar, until the collar having the supporting surface bears against the recess. Expansion of the collar may be varied within admissible limits so that, if necessary, a preloading force may be adjusted at the collar which relieves the self-clinched engagement of the closing member.

Further objectives, features, advantages and possible applications of the present invention can be seen from the following description of an embodiment taking reference to the accompanying drawing. All features described and/or illustrated per se, or in any suitable combination desired, represent the subject matter of the present invention, irrespective of their combination in the claims or their appendency.

DETAILED DESCRIPTION OF THE INVENTION

Figure 1:
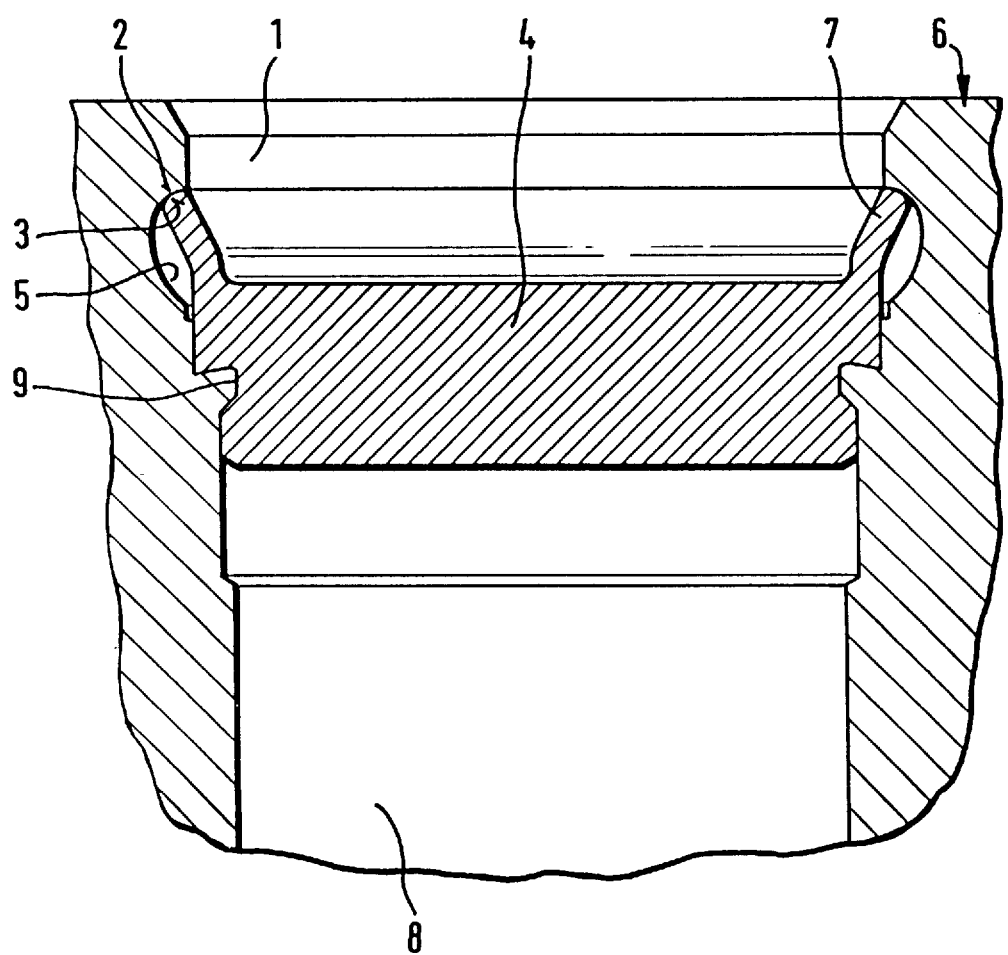
FIG. 1 is a schematic view of the closing device disclosed in the present invention.

In a profiled cross-sectional view, the closing device includes a closing member 4 which has a generally bowlshaped cross-section. Closing member 4 is attached in a stepped bore by a self-clinched engagement and by expansion. The point of self-clinched engagement between the housing bore and the closing member 4 is shown by the material of housing 6 which is plastically deformed into an indentation 9 in the closing member 4. On either side of the indentation 9, the closing member 4 has piston portions of differently large diameters, which are correspondingly adapted to the outside bore portion 1 and the inside bore portion 8. During press fitting the closing member 4 into the stepped bore, the piston portions support the deformation of the housing material into the indentation 9. The indentation 9 is comparable with a cavetto-type recess on the periphery of the closing member 4 which provides a metallic sealing effect besides the retaining force. The rim on the closing member 4 proximate the outside bore portion 1 forms a collar 7. The end surface of collar 7, performing a function as supporting surface 3, abuts in the arcuate recess 5 of the outside bore portion 1. The collar 7 is shown in the expanded condition, an arcuate portion in the recess 5, configured as supporting surface 2, assisting in transmitting the retaining force (axial force). Like the indentation 9 on the closing member 4, the recess 5 in the housing 6 can be freely chosen, within certain limits, with respect to its geometry. Thus, defined geometrical modifications are possible with respect to the shape of the recess 5 recessed in the outside bore portion 1. The expansion of collar 7 must be chosen such that the sealing effect of the housing material in the indentation 9 is maintained in all operating conditions. Therefore, the supporting surface 3 on collar 7 is used in first place for the transmission of force. In a critical case, it must be ensured that a minimal clearance, which possibly remained between the supporting surface 3 on the collar 7 and the supporting surface 2 on the housing 6, after the expansion should be sized to be so small that any possible deformation of the point of self-clinched engagement caused by the high hydraulic operating pressure is absorbed by a prompt supporting effect of the collar 7 in the recess 5 in order to prevent leakages at the point of self-clinched engagement. Therefore, it is appropriate to rate the expansion of the collar 7 so that already a static preloading force is effective between the supporting surfaces 2 of the housing 6 and the closing member 4. A retroactive ventilating movement of the closing member 4 is thereby prevented. A high amount of mechanical stress on the collar 7 is possible by the substantially rectangular cross-section of the collar which has a correspondingly great polar moment of inertia in the direction of the vertical axis. Thus, the expansion of the collar 7 is not absolutely limited to a deformation to be initiated from the outside, but can occur automatically, due to a corresponding selection of material and shaping of the closing member 4. Therefore, different from what is shown in the drawing, the collar 7 is not required to have a largely closed configuration at the periphery, but may be configured in the shape of a tongue.

With respect to the features of the present invention relating to process engineering, it should be noted that the combination of a self-clinched engagement and a straddle closure provided homogeneously on the closing member 4 achieves a rotationally symmetric component part which is relatively easy to manufacture. In a first process step, this component part must only be press fitted into the stepped bore of the housing 6 including a recess 5, until the housing material deforms into the indentation 9 in the closing member 4 correspondingly to generate a retaining and sealing force. An additional retaining mechanism for the closing member 4 in the bore is achieved by a subsequent expansion of the collar 7 which initially extends in a straight line and is adapted to the inside diameter of the outside bore portion 1.

A highly resistant closing device for closing bores or channels conveying pressure fluid is achieved by the structural and process engineering features of the present invention. The closing device obviates the need for separate sealing and retaining arrangements.

We claim:

1. Closing device of the type which is press fitted into a channel of a housing, comprising:
    a body portion including at least one indentation into which material of the housing is deformed to provide a form lock, wherein the closing member is made of metal hard enough to deform the housing, wherein the body portion has two substantially cylindrical portions of different diameters wherein the indentation resides between the substantially cylindrical portions and is undercut relative to at least one of said two substantially cylindrical portions, a collar-like supporting surface portion attached to and extending from said body portion beyond said two substantially cylindrical portions and expandable to engage in a recess of said channel.

2. Closing device as claimed in claim 1, wherein, the supporting surface includes a collar.

3. Method of closing a pressure fluid conveying channel in a housing by a closing member, the housing having an outside surface, and the closing member including at least one annular indentation and at least one deformable supporting surface directed to the outside surface, the method including the steps of:
    pressing the closing member into that channel,
    deforming housing material into said indentation by pressing the closing member into the channel, and
    expanding said at least one supporting surface into engagement with a recess of said channel.

4. Method as claimed in claim 3, including the steps of:
    pressing against said supporting surface until the supporting surface of the closing member extends into the recess.

* * * * *